United States Patent [19]

Riedl

[11] Patent Number: 4,881,294

[45] Date of Patent: Nov. 21, 1989

[54] AUXILIARY HANDLE FOR HAND-HELD TOOL

[75] Inventor: Reinhard Riedl, Grossenzemoos, Fed. Rep. of Germany

[73] Assignee: Hilti Aktiengesellschaft, Fürstentum, Liechtenstein

[21] Appl. No.: 245,129

[22] Filed: Sep. 15, 1988

[30] Foreign Application Priority Data

Sep. 16, 1987 [DE] Fed. Rep. of Germany ....... 3731059

[51] Int. Cl.$^4$ ......................... B23B 47/00; B25G 1/00; B25G 3/00

[52] U.S. Cl. ............................ 16/114 R; 16/DIG. 40; 408/241 R; 408/241 S

[58] Field of Search .... 16/114 R, DIG. 40, DIG. 41; 408/14, 72 R, 87, 113, 241 R, 241 S

[56] References Cited

U.S. PATENT DOCUMENTS 2,978,931 4/1961 Broden ........................ 408/241 S X
3,537,336 11/1970 Schmuck ..................... 408/241 S X
4,820,090 4/1989 Chen ................................ 16/116 R

FOREIGN PATENT DOCUMENTS 1972371 7/1967 Fed. Rep. of Germany .
8318425 6/1983 Fed. Rep. of Germany .
2165480 4/1986 United Kingdom ............ 408/241 R

*Primary Examiner*—Nicholas P. Godici
*Assistant Examiner*—William Scott Andes
*Attorney, Agent, or Firm*—Toren, McGeady & Associates

[57] ABSTRACT

An auxiliary handle is attachable by a band-shaped clamping member of a clamping device to a housing part of a hand tool such as a drill. A bearing part, supportable on the housing part, has alignable through openings for an axially extending depth stop. A U-shaped separate part is in engagement with the clamping member and has a through guide alignable with the through openings. When the clamping member is tightened on the housing part, it displaces the separate part transversely of the axis of the through opening for clamping the depth stop in the through openings.

9 Claims, 1 Drawing Sheet

AUXILIARY HANDLE FOR HAND-HELD TOOL

BACKGROUND OF THE INVENTION

The present invention is directed to an auxiliary handle attachable to a hand-held tool, such as a drilling device, and includes a gripping sleeve rotatable about the sleeve axis. The sleeve is engageable with a clamping device including a band-shaped clamping member which can be tightened about a housing part of the tool by rotating the gripping sleeve. The clamping device has a through guide extending transversely of the axis of the sleeve with a rod-shaped depth stop extending through the through guide. The depth stop can be clamped in the clamping device by rotating the sleeve.

Auxiliary handles on hand-held tools are used for improved support and guidance of the tool by an operator. Such auxiliary handles improve the ability of the operator to counter the torque or turning moment during drilling operations.

A known drilling device disclosed in DE-GM 1 972 371 discloses an auxiliary handle fastened on a drill by a clamping member made up of two stirrups connected together in an articulated manner so that they loop around a cylindrical housing part. A rod-shaped depth stop forms the axis of articulation for the two stirrups. The stirrups of the clamping member are pressed against one another in a tongue-like manner when a gripping sleeve is rotated for securely clamping the housing part located between them. As a reaction to the clamping, transverse forces, which effect a secure clamping of the depth stop, also develop in the articulated parts of the two stirrups.

This known solution is relatively costly with regard to production. In addition, it is not possible to use the auxiliary handle without a depth stop, since the stop forms a part of the clamping mechanism. Furthermore, the clamping stirrups, which are relatively thick in cross section, impede the use of the drilling devices, such as in corners or in boreholes with small spacing between walls.

Another known auxiliary handle is set forth in DE GM 8 318 425 and includes a clamping member formed of a relatively thin band which loops around the housing part and is clamped by a so-called T-head bolt. This arrangement permits clamping of the auxiliary handle when there are large tolerance deviations in the housing part. In this arrangement, the depth stop is clamped by a separate clamping device at the auxiliary handle. As a result this arrangement is costly and prevents a compact construction. Moreover, it requires separate operating elements for clamping the auxiliary handle on the housing part and clamping the depth stop. As a result, operation of the tool is more difficult.

SUMMARY OF THE INVENTION

Therefore, the primary object of the present invention is to provide a simple and reliable arrangement for clamping the auxiliary handle and the depth stop.

In accordance with the present invention, a bearing part is supported on the housing part to which the handle is secured and has through openings for the depth stop, and through guides are formed in a clamping device so that the guides can be offset or displaced relative to the through openings for effecting clamping of the depth stop.

Clamping of the depth stop is effected by a lateral displacement of the clamping device relative to the bearing part with the bearing part being supported directly at the housing part so that the depth stop is clamped. The attachment of the clamping member on the housing part does not interfere with the clamping of the depth stop.

Preferably, the bearing part has at least two bearing walls spaced apart in the direction of displacement of the depth stop. These bearing walls, containing the through openings, afford favorable guidance and support of the depth stop.

The bearing part is connected with a fastening bracket of the auxiliary handle so that it can be detached. Accordingly, the bearing part and the fastening bracket form a unit. As a result, it is possible to remove and, if necessary, replace the depth stop without any concern that the bearing part may fall out or become lost.

The through guides for the depth stop are preferably formed in two side walls of the clamping device with the side walls spaced apart in the direction of displacement of the depth stop. Such an arrangement of the side walls enables a favorable distribution of the clamping forces on the depth stop. Bending stresses on the depth stop can be avoided by arranging the side walls of the clamping device and the bearing walls of the bearing part adjacent to one another.

Preferably, the side walls are formed as a separate part detachably connected to the clamping member. Such a separate part provides simple production and makes it possible to use material for forming both of the parts best suited for their use. The separate part can be replaced in a simple manner, for example, when there is excessive wear of the through guides in the side walls of the part.

It is expedient to form the separate part as a U-shaped member with its bight portion engageable under the clamping member. The U-shaped separate part embraces the clamping member on three sides. Accordingly, the separate part is centered and, at the same time, laterally supported relative to the clamping member. A favorable transmission of the clamping force is effected when the separate part engages under the clamping member.

The various features of novelty which characterizes the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
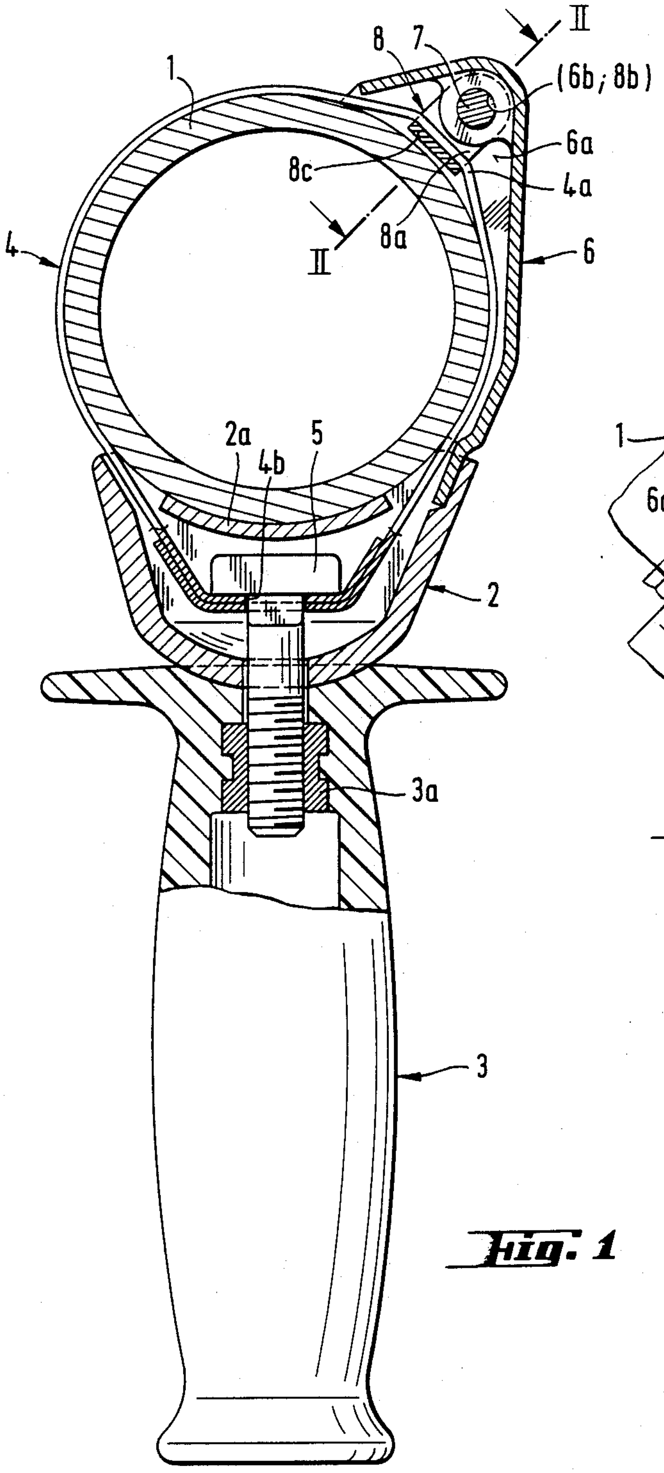
FIG. 1 is an elevational view, partly in section, of an auxiliary handle, embodying the present invention, mounted on a tool with the handle including a depth stop.
Figure 2:
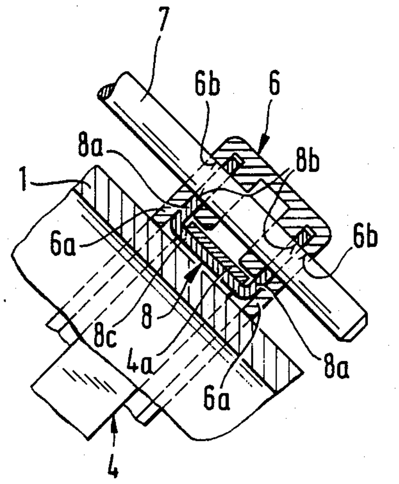
FIG. 2 is a sectional view of a part of the auxiliary handle and tool taken along the line II—II in FIG. 1.

In FIGS. 1 and 2 an auxiliary handle is secured on an annular housing part 1 of a hand-held tool, such as a drill. The auxiliary handle is made up of a fastening bracket 2 mounted on one end of an axially elongated gripping sleeve 3 connected to the bracket. The sleeve is rotatable around its axis. Fastening bracket 2 includes an arcuately shaped support 2*a* for the housing part 1. A clamping device for the auxiliary handle includes a band-shaped clamping member 4 looped around the housing part 1. Clamping member 4 has an outwardly pressed portion 4*a* extending in the circumferential direction of the housing part 1 and spaced outwardly from the housing part. Clamping member 4 has overlapping opposite ends extending downwardly below the support 2*a* within the fastening bracket 2. The overlapping ends of the clamping member have aligned openings 4*b* through which a T-head bolt 5 extends. The head of the bolt 5 bears against the overlapping ends and the bolt has an axially extending threaded shank screwed into a threaded bushing 3*a* in the end of the sleeve supporting the fastening bracket. A bearing part 6 is detachably connected with the fastening bracket 2 and extends from the fastening bracket upwardly over the portion 4*a* of the clamping member 4.

Bearing part 6 acts to secure an axially elongated rodshaped depth stop 7 with the axis of the depth stop extending transversely of the axis of the sleeve 3. The depth stop 7 is axially displaceable through the bearing part 6. Bearing part 6, note FIG. 2, has a pair of bearing walls 6*a* spaced apart in the axial direction of the depth stop. The bearing walls 6*a* are supported on the housing part 1. The bearing walls 6*a* have aligned through openings 6b through which the depth stop 7 extends. In addition to the clamping member 4 the clamping device includes a separate U-shaped part 8 in contact with the clamping member in the region of the outwardly pressed portion 4*a*. Separate part 8 has two side walls 8*a* projecting outwardly from a web or bight part 8*c*, note FIG. 2. The side walls 8*a* are spaced apart in the axial direction of the depth stop 7 and extend outwardly from the bight part 8*c* extending under the clamping member 4, that it between the clampng member and the outer surface of the housing part 1. Side walls 8*a* have aligned through guides 8*b* through which the depth stop 7 extends. As shown in FIG. 2 the side walls 8*a* extend into slotted portions of the bearing part 8, that is, into the bearing walls 6*a*.

By rotating the sleeve 3 about its axis which passes through the axis of the bolt 5, the head of the bolt bears against the overlapping ends of the clamping member 4 and tightens the clamping member about the housing part 1. During such tightening action, the clamping member 4 presses the web or bight part 8*c* of the separate part 8 inwardly against the outer surface of the housing part 1. As a result, the separate part 8 is displaced inwardly relative to the bearing part 6 so that the through guides 8*b* in the walls 8*a* are offset relative to the through openings 6*b* in the bearing walls 6*a*. This transverse displacement of the separate part 8 effects a clamping of the depth stop in the bearing part. At the same time, the tightening action of the clamping member 4 secures the auxiliary handle on the housing part 1.

While specific embodiments of the invention have been shown and described in detail to illustrate the application of the inventive principles, it will be understood that the invention may be embodied otherwise without departing from such principles.

I claim:

1. Auxiliary handle attachable to a hand-held device, such as a drill, comprising an axially elongated gripping sleeve having an axis, clamping means for fastening said handle on a housing part of a tool, said sleeve being rotatable about the axis thereof, said clamping means including a clamping member for encircling the housing part, said clamping member connected to said sleeve so that by selectively rotating sleeve the clamping member can be clamped on the housing part, said clamping means includes means forming a through guide for an axially elongated rod-shaped depth stop with the axis of said stop extending transversely of the axis of said sleeve, wherein the improvement comprises that said clamping member is a band-shaped member and is looped completely around said housing part and has an inside cross-section so that as said sleeve is selectively rotated, the inside cross-section of said clamping member is reduced and tightens about said housing part, a bearing part separate from said clamping member and arranged to contact the housing part and having at least one through opening for the depth stop, said bearing part being stationary during selective rotation of said sleeve, said through guide of said clamping means being alignable with the through opening of said bearing part and said through guide being displaceable transversely of the axis of the through being displaceable transversely of the axis of the through opening for clamping said depth stop.

2. Auxiliary handle, as set forth in claim 1, wherein said bearing part comprises at least two bearing walls spaced apart in the axial direction of said depth stop with said walls each having one said through opening therethrough.

3. Auxiliary handle, as set forth in claim 1, wherein a fastening bracket is mounted on one end of said gripping sleeve, and said bearing part is detachably connected with said fastening bracket.

4. Auxiliary handle, as set forth in claim 3, wherein said fastening bracket includes a shaped support part for supporting the housing part.

5. Auxiliary handle, as set forth in claim 3, wherein said bearing part is located outwardly of said clamping member relative to the housing part and extends from said fastening bracket for at least a portion of the extent of said clamping member extending around said housing part.

6. Auxiliary handle, as set forth in claim 1, wherein said means forming a through guide includes at least two side walls spaced apart in the axial direction of said depth stop and each of said side walls having one said through guide therethrough.

7. Auxiliary handle, as set forth in claim 6, wherein said through guides comprises a separate part with said side walls forming a part of said separate part, and said clamping member comprising a band-shaped member with said separate part being positioned, at least in part between said band-shaped member and the housing part.

8. Auxiliary handle, as set forth in claim 7, wherein said separate part is U-shaped with said side walls being interconnected by a bight part with said bight part in contact with said band-shaped member, and said bight part is located between the band-shaped member and the housing part.

9. Auxiliary handle, as set forth in claim 7 wherein said gripping sleeve includes a T-head bolt threaded into said gripping sleeve and extending outwardly therefrom and having a head located within said fastening bracket with said bolt extending through openings in overlapping ends of said band-shaped member.

* * * * *